US010795080B1

(12) United States Patent
Bao et al.

(10) Patent No.: US 10,795,080 B1
(45) Date of Patent: Oct. 6, 2020

(54) OPTICAL RECEIVER WITH PHOTODIODE DISPOSED DIRECTLY ON A PLANAR LIGHTWAVE CIRCUIT

(71) Applicant: Lumentum Operations LLC, Milpitas, CA (US)

(72) Inventors: Yujian Bao, Shenzhen (CN); Zhaoming Li, Shenzhen (CN)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 16/454,920

(22) Filed: Jun. 27, 2019

(30) Foreign Application Priority Data

Apr. 4, 2019 (WO) ................ PCT/CN2019/081456
Jun. 14, 2019 (WO) ................ PCT/CN2019/091382

(51) Int. Cl.
*G02B 6/122* (2006.01)
*G02B 6/42* (2006.01)
*G02B 6/12* (2006.01)
*H04B 10/69* (2013.01)

(52) U.S. Cl.
CPC ............ *G02B 6/122* (2013.01); *G02B 6/423* (2013.01); *G02B 6/4214* (2013.01); *H04B 10/6911* (2013.01); *G02B 2006/12104* (2013.01); *G02B 2006/12123* (2013.01); *G02B 2006/12135* (2013.01)

(58) Field of Classification Search
CPC ..................................................... G02B 6/122
See application file for complete search history.

(56) References Cited

U.S. PATENT DOCUMENTS

| 6,709,607 | B2 * | 3/2004 | Hibbs-Brenner | ........ G02B 6/30 216/24 |
| 6,834,133 | B1 * | 12/2004 | Towle | ................ G02B 6/4232 385/129 |
| 7,372,120 | B1 * | 5/2008 | George | ................ H01L 21/563 257/432 |
| 2003/0118288 | A1 | 6/2003 | Korenaga et al. | |
| 2005/0201668 | A1 | 9/2005 | Neta | |
| 2013/0272664 | A1 * | 10/2013 | Arao | ....................... G02B 6/43 385/89 |
| 2017/0168252 | A1 | 6/2017 | Pezeshki et al. | |

FOREIGN PATENT DOCUMENTS

| CN | 201903673 U | 7/2011 |
| CN | 102914834 A | 2/2013 |
| JP | H03290606 A | 12/1991 |

OTHER PUBLICATIONS

International Search Report and Written Opinion for Application No. PCT/CN2019/081456, dated Jan. 9, 2020, 10 pages.
International Search Report and Written Opinion for Application No. PCT/CN2019/091382, dated Jan. 6, 2020, 9 pages.

* cited by examiner

*Primary Examiner* — Sung H Pak
(74) *Attorney, Agent, or Firm* — Harrity & Harrity, LLP

(57) ABSTRACT

An optical receiver may include a planar lightwave circuit with an optical path and a tapered reflection surface to direct an optical beam toward a top surface of the planar lightwave circuit. The optical receiver may include a photodiode disposed onto the top surface of the planar lightwave circuit such that a receive portion of the photodiode is aligned to the optical path, wherein a gap between the photodiode and the planar lightwave circuit is less than 5 microns.

20 Claims, 4 Drawing Sheets

OPTICAL RECEIVER WITH PHOTODIODE DISPOSED DIRECTLY ON A PLANAR LIGHTWAVE CIRCUIT

RELATED APPLICATION(S)

This application claims priority under 35 U.S.C. § 119 to Patent Cooperation Treaty (PCT) Application No. PCT/CN2019/081456, filed on Apr. 4, 2019 and Patent Cooperation Treaty (PCT) Application No. PCT/CN2019/091382, filed on Jun. 14, 2019, the content of which are incorporated by reference herein in its entirety.

TECHNICAL FIELD

The present disclosure relates to optical modules. More particularly, some aspects of the present disclosure relate to an optical receiver with a photodiode disposed directly on a planar lightwave circuit.

BACKGROUND

An optical module, such as an optical transceiver or an optical receiver, may include multiple components aligned in an optical path and/or electrically connected. For example, an optical receiver may include an optical demultiplexer, a photodiode array, a transimpedance amplifier and a clock and data recovery module (TIA/CDR), and/or the like. The optical demultiplexer may be implemented using free space filters or a planar lightwave circuit. The photodiode array may include multiple photodiodes aligned to an optical path of, for example, the planar lightwave circuit, and electrically connected to the TIA/CDR. The photodiode array and the TIA/CDR may be die bonded to a substrate. Outputs of optical waveguides of the planar lightwave circuit may be aligned to the photodiode array after the photodiode array is die bonded to the substrate.

An active alignment procedure may be performed to align each photodiode, of the photodiode array, to a corresponding output of a corresponding optical waveguide of the planar lightwave circuit. For example, an optical beam may be provided to an output of the optical waveguide and may be received by a photodiode during the active alignment procedure. In this case, a hill climbing procedure, for example, may be performed to determine a position of the photodiode at which an intensity of the optical beam as measured by the photodiode is at a maximum. At the position of maximum intensity, the photodiode may be determined to be aligned with the output of the optical waveguide. As increasing quantities of photodiodes are deployed in optical communications systems, active alignment procedures may take excessive amounts of time, which may result in a production constraint for optical modules.

SUMMARY

According to some possible implementations, an optical receiver may include a planar lightwave circuit with an optical path and a tapered reflection surface to direct an optical beam toward a top surface of the planar lightwave circuit. The optical receiver may include a photodiode disposed onto the top surface of the planar lightwave circuit such that a receive portion of the photodiode is aligned to the optical path, wherein a gap between the photodiode and the planar lightwave circuit is less than 5 microns.

According to some implementations, a method may include passively aligning, by a device, a photodiode to an output, of an optical path of a planar lightwave circuit, on a top surface of the planar lightwave circuit such that a receive portion of the photodiode is aligned to the output of the optical path of the planar lightwave circuit, wherein the optical path of the planar lightwave circuit extends along the top surface of the planar lightwave circuit and is directed by a tapered reflection surface of the planar lightwave circuit toward the output on the top surface of the planar lightwave circuit; and bonding, by the device, the photodiode to the top surface of the planar lightwave circuit based on passively aligning the photodiode to the output of the optical path.

According to some possible implementations, an optical module may include a planar lightwave circuit with an optical path and a tapered reflection surface to direct an optical beam toward a top surface of the planar lightwave circuit. The optical module may include a matching block with a tapered surface matched to the tapered reflection surface to structurally support the tapered reflection surface. The optical module may include a photodiode disposed onto the top surface of the planar lightwave circuit such that a receive portion of the photodiode is aligned to the optical path, wherein a gap between the photodiode and the planar lightwave circuit is less than 1 microns. The optical module may include a transimpedance amplifier and clock and data recovery module connected to the photodiode.

DETAILED DESCRIPTION

The following detailed description of example implementations refers to the accompanying drawings. The same reference numbers in different drawings may identify the same or similar elements.

To perform active alignment, a photodiode is positioned at greater than a threshold distance from the planar lightwave circuit to account for a spreading of a beam from the output waveguide. The photodiode is then moved to enable measurement of an intensity of an optical beam at different positions to enable a determination of a position at which the intensity of the optical beam is at a maximum. However, using active alignment to align a photodiode on a substrate to an output waveguide of a planar lightwave circuit may be excessively time-consuming.

Some implementations described herein may die bond a photodiode directly onto the output waveguide of the planar lightwave circuit. For example, the photodiode may be aligned using a passive alignment procedure, thereby enabling the photodiode to be mounted directly to the planar lightwave circuit using die bonding. In this way, an amount of time to align the photodiode is reduced, thereby reducing processing bottlenecks. Furthermore, based at least in part on disposing a matching block against a tapered reflection surface of the planar lightwave circuit, a likelihood of damaging the planar lightwave circuit when die bonding the photodiode to the planar lightwave circuit is reduced, thereby enabling the photodiode to be disposed directly on the planar lightwave circuit. In this way, a durability of optical modules, such as optical receivers and/or optical transceivers, may be improved.

Figure 1:
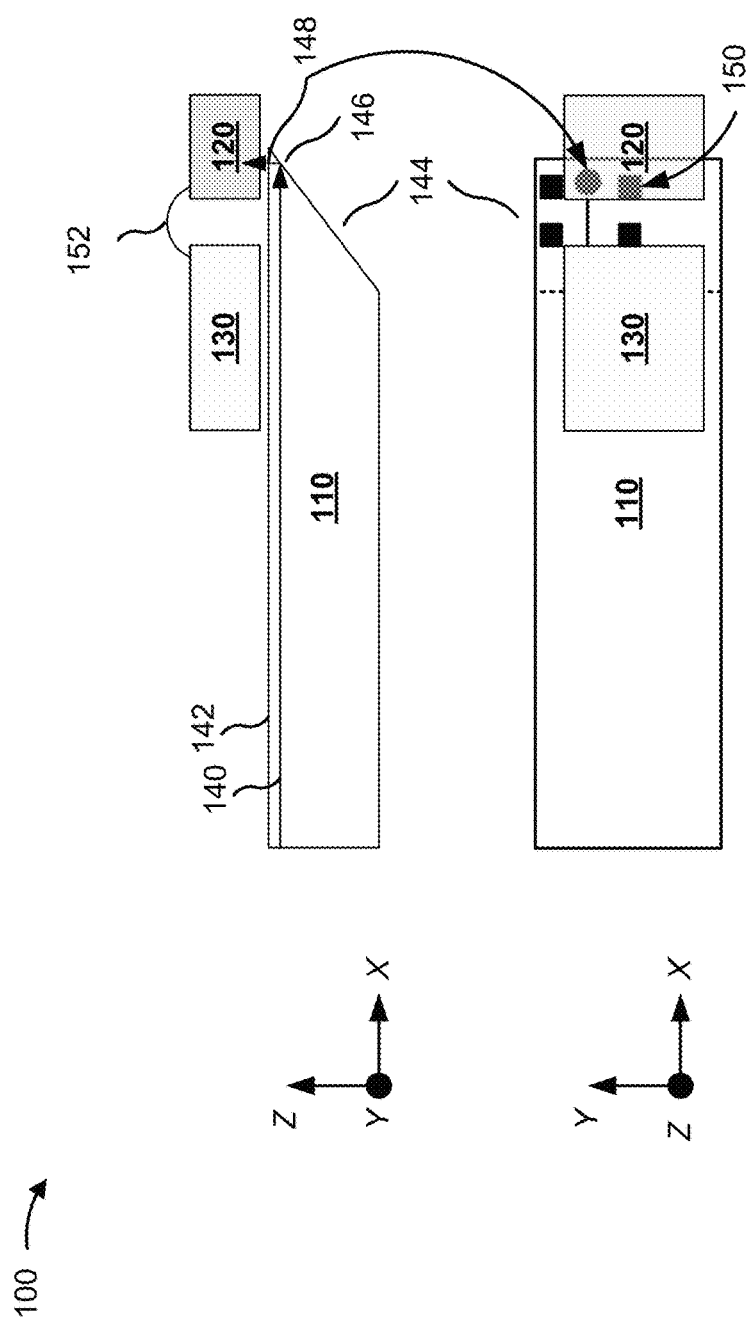
FIGS. 1-3 are diagrams of example implementations described herein.

FIG. 1 is a diagram of an optical module 100 described herein. As shown in FIG. 1, optical module 100 may include a planar lightwave circuit 110 and a photodiode 120. In some implementations, optical module 100 may include a transimpedance amplifier with clock and data recovery (TIA/CDR 130). In some implementations, optical module 100 may include multiple photodiodes 120 (e.g., a photodiode array) on a planar lightwave circuit 110.

Planar lightwave circuit 110 may include an optical waveguide chip structure of an optical receiver, an optical module, an optical demultiplexer, and/or the like. In some implementations, planar lightwave circuit 110 may include a waveguide 140. For example, planar lightwave circuit 110 may include a waveguide 140 that is disposed within a threshold depth (e.g., with respect to the Z-axis) of a top surface 142 of planar lightwave circuit 110. Additionally, or alternatively, planar lightwave circuit may include one or more free space filters or other optical components.

In some implementations, planar lightwave circuit 110 may include a tapered reflection surface 144 defining a tapered region of planar lightwave circuit 110. For example, reflection surface 144 may be tapered to direct waveguide 140 from an orientation parallel to top surface 142 to an orientation orthogonal to top surface 142 (e.g., from an orientation parallel to the X-axis to an orientation parallel to the Z-axis). In this case, waveguide 140 may cause light to be reflected off reflection surface 144 at reflection point 146 and to exit planar lightwave circuit 110 at output 148. In some implementations, reflection surface 144 may be uncoated. For example, reflection surface 144 may use total internal reflection to reflect light at reflection point 146. Additionally, or alternatively, reflection surface 144 may be metal coated, as described in more detail herein. When light is output by planar lightwave circuit 110, the light may be directed toward an input (e.g., a receive portion) of photodiode 120.

Photodiode 120 may include an optical photodiode that is aligned to output 148 of planar lightwave circuit 110. In some implementations, photodiode 120 may be a photodiode array. For example, photodiode 120 may be a 4 channel photodiode array aligned to 4 outputs 148 of planar lightwave circuit 110. In some implementations, a receive portion of photodiode 120 may be passively aligned using a set of fiducial markers 150 disposed on top surface 142 of planar lightwave circuit 110, as described in more detail herein. For example, photodiode 120 may be aligned with respect to a first degree of freedom (e.g., along the X-axis) and a second degree of freedom (e.g., along the Y-axis) by using the fiducial markers 150, and may be aligned with respect to a third degree of freedom (e.g., along the Z-axis) by using a force sensor (e.g., to determine when photodiode 120 is disposed on top surface 142 of planar lightwave circuit 110 for die bonding or flip-chip bonding).

In some implementations, a surface of photodiode 120 (e.g., at a receive portion of photodiode 120) may be within a threshold proximity of top surface 142 of planar lightwave circuit 110. For example, photodiode 120 and planar lightwave circuit 110 may be aligned with less than a threshold tolerance such that a gap between a surface of photodiode 120 and a surface of planar lightwave circuit 110 (e.g., top surface 142) is less than approximately 5 microns, approximately 3 microns, approximately 1 micron, and/or the like. In this way, by using passive alignment, the gap may be reduced relative to active alignment, thereby increasing optical efficiency. In some implementations, photodiode 120 is die bonded to planar lightwave circuit 110. For example, based on using a passive alignment process, photodiode 120 may be die bonded directly onto top surface 142 of planar lightwave circuit 110. In some implementations, photodiode 120 is flip-chip bonded to planar lightwave circuit 110, as described in more detail herein.

TIA/CDR 130 may be a component that is connected to photodiode 120 via wire bond 152 to enable operation of photodiode 120. For example, TIA/CDR 130 may receive an output of photodiode 120 (e.g., a current) and provide a corresponding output (e.g., a voltage) as a response. Additionally, or alternatively, TIA/CDR 130 may perform a clock recovery operation to determine timing information regarding a data stream output of photodiode 120 to enable decoding of transmitted symbols at the output of photodiode 120.

As indicated above, FIG. 1 is provided merely as an example. Other examples may differ from what is described with regard to FIG. 1.

Figure 2:
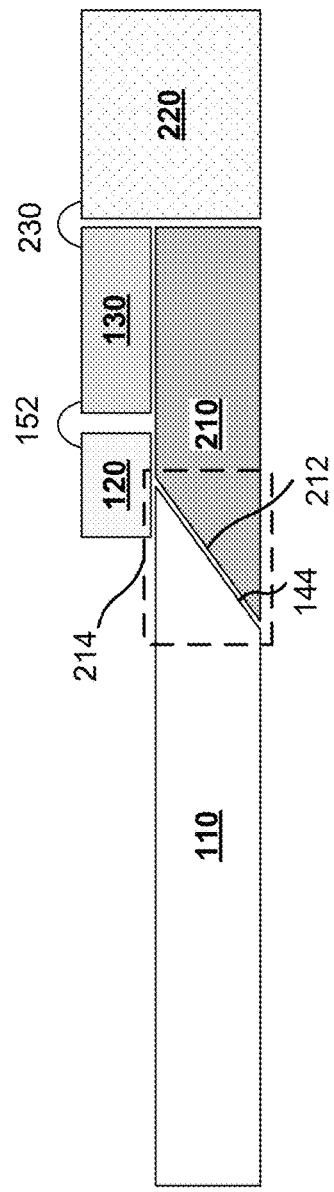

FIG. 2 is a diagram of an optical module 200 described herein. As shown in FIG. 2, optical module 200 may include a planar lightwave circuit 110, a photodiode 120, and a TIA/CDR 130. In some implementations, TIA/CDR 130 may disposed on a matching block 210 and connected to an output block 220.

Matching block 210 may be a substrate with a tapered surface 212 matched to reflection surface 144 of planar lightwave circuit 110. In this case, by bonding matching block 210 to reflection surface 144 of planar lightwave circuit 110, a likelihood of damage to tapered region 214 of planar lightwave circuit 110 (e.g., a tapered portion of planar lightwave circuit 110 that includes reflection surface 144) is reduced relative to mounting photodiode 120 directly on planar lightwave circuit 110 without matching block 210. In some implementations, when photodiode 120 is bonded to matching block 210, reflection surface 144 may be coated to avoid light in waveguide 140 passing through reflection surface 144 to matching block 210. For example, reflection surface 144 may be metal coated. In some implementations, matching block 210 may be formed from a particular material. For example, matching block 210 may be a silicon matching block to ensure a coefficient of thermal expansion (CTE) match with planar lightwave circuit 110. In this case, a first CTE of planar lightwave circuit 110 and a second CTE of matching block 210 may be within a threshold amount, such as a CTE difference of less than approximately 3.

Output block 220 may be bonded to matching block 210 and/or TIA/CDR 130. For example, output block 220 may be bonded to matching block 210 and TIA/CDR 130, and wire bonded to TIA/CDR 130 via wire bond 230. In this case, TIA/CDR 130 may be disposed between photodiode 120 and output block 220, which may reduce a difficulty in electrically connecting TIA/CDR 130 to output block 220 and/or a length of an electrical trace forming wire bond 230, thereby reducing interference. In some implementations, output block 220 may include one or more components of optical module 200, such as a direct current output, a radio frequency output, and/or the like. In some implementations, output block 220 may be associated with a particular structure. For example, output block 220 may be a flexible printed circuit board, a rigid printed circuit board, and/or the like.

As indicated above, FIG. 2 is provided merely as an example. Other examples may differ from what is described with regard to FIG. 2.

Figure 3:
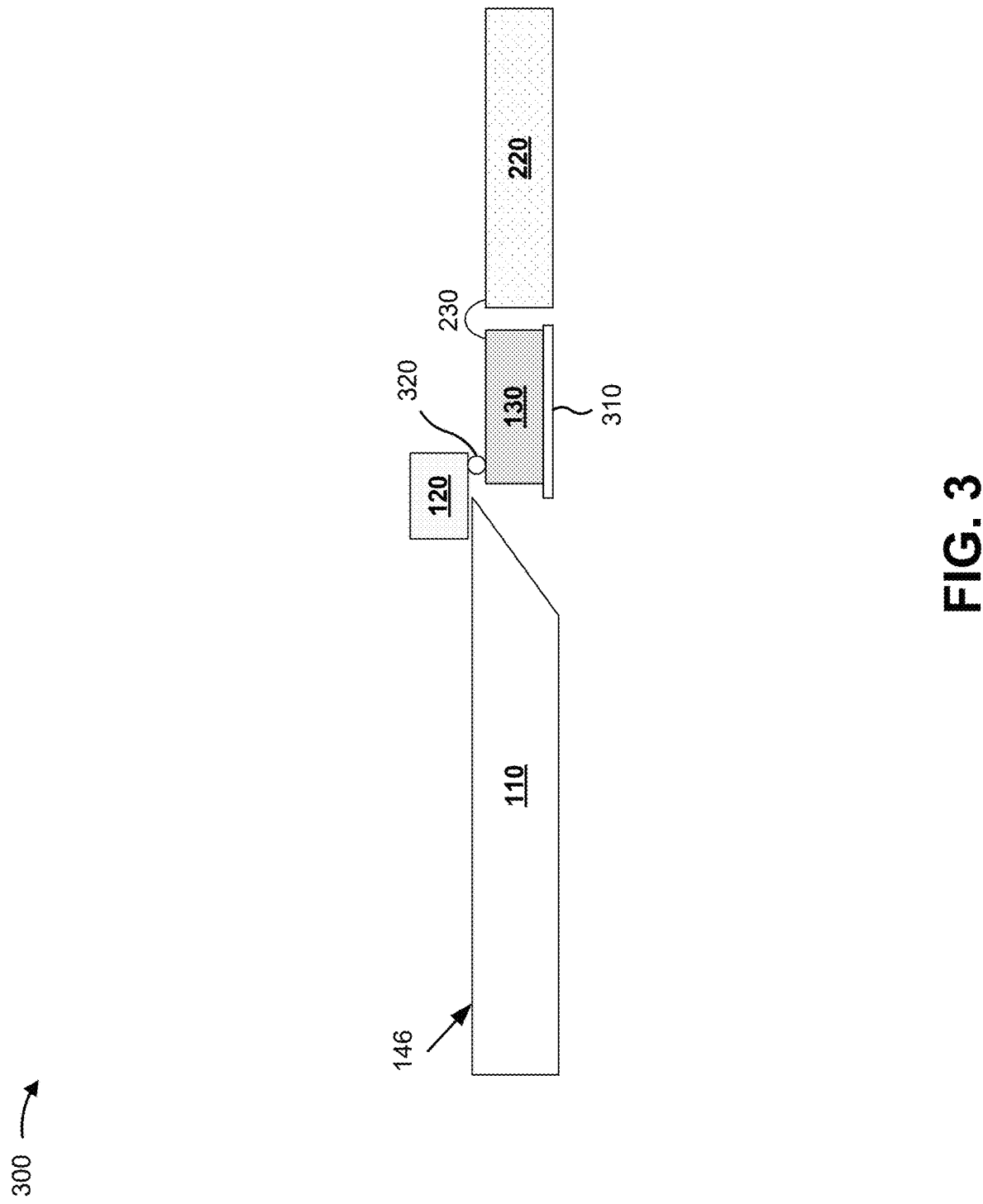

FIG. 3 is a diagram of an optical module 300 described herein. As shown in FIG. 3, optical module 300 may include a planar lightwave circuit 110, a photodiode 120, a TIA/CDR 130, and an output block 220.

In some implementations, TIA/CDR 130 may be mounted on a substrate 310. For example, TIA/CDR 130 may be mounted on substrate 310, which may be configured with a thickness to match a height of TIA/CDR 130 and top surface 142 of planar lightwave circuit 110. For example, TIA/CDR 130 may receive photodiode 120 when photodiode 120 is flip-chip bonded to TIA/CDR 130 and planar lightwave circuit 110. In this case, photodiode 120 may be front-illuminated, and an optically sensitive portion of photodiode 120 (e.g., a receive portion) and electrodes of photodiode 120 may be on a same side of photodiode 120. In this way, photodiode 120 may be bonded directly to planar lightwave circuit 110 and TIA/CDR 130 (e.g., at bonding location 320, which may be a solder bond for flip-chip bonding), thereby obviating a need for a wire bond to connect photodiode 120 and TIA/CDR 130. Moreover, based on directly mounting photodiode 120 to TIA/CDR 130, a radio frequency trace size (from photodiode 120 to TIA/CDR 130) is reduced relative to using a wire bond, thereby improving radio frequency performance of optical module 300. Moreover, based on forming a single rigid structure from planar lightwave circuit 110, photodiode 120, TIA/CDR 130, substrate 310, and output block 220, a durability of optical module 300 is improved. In some implementations, photodiode 120 may be associated with a solder ball grid to enable a direct connection to TIA/CDR 130 at bonding location 320.

As indicated above, FIG. 3 is provided merely as an example. Other examples may differ from what is described with regard to FIG. 3.

Figure 4:
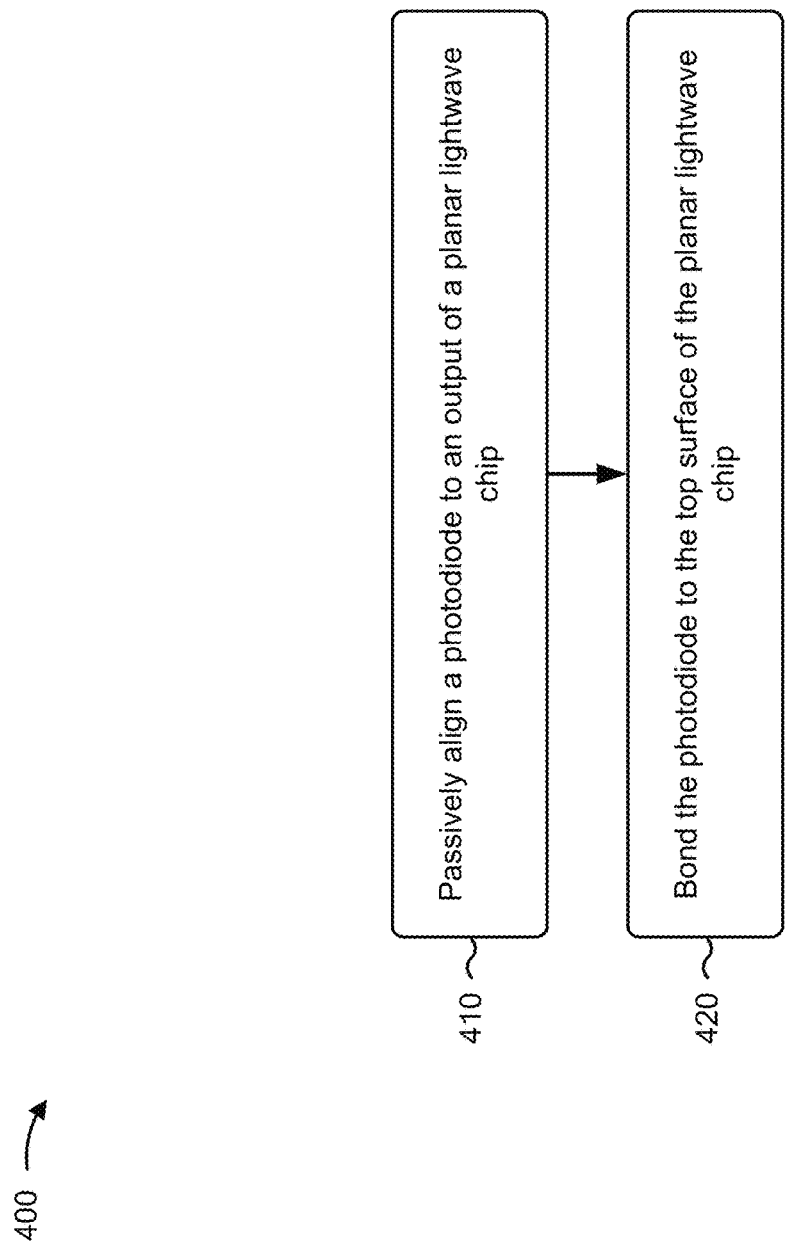
FIG. 4 is a flow chart of an example process for mounting a photodiode directly on a planar lightwave circuit using passive alignment.

FIG. 4 is a flow chart of an example process 400 for manufacturing an optical module, such as an optical receiver, an optical transceiver, and/or the like.

As shown in FIG. 4, process 400 may include passively aligning a photodiode to an output of a planar lightwave circuit (block 410). For example, a device (e.g., a pick-and-place device or another computer-aided manufacturing device) may passively align the photodiode to the output of the planar lightwave circuit (e.g., without causing optical signals to be provided from the output of the planar lightwave circuit to an input of the photodiode). In some implementations, the device may cause a receive portion of the photodiode to be aligned with the output of the planar lightwave circuit. In some implementations, the device may use fiducial markers to passively align the photodiode to the output of the planar lightwave circuit. For example, the device may include a computer-vision module for identifying a location of a set of fiducial markers on a surface of the planar lightwave circuit, and may align the photodiode to the set of fiducial markers, thereby aligning the photodiode to the output of the planar lightwave circuit.

In some implementations, the device may use the fiducial markers to align the photodiode with respect to a first degree of freedom and a second degree of freedom. For example, the device may use the fiducial markers to ensure that the receive portion is aligned to the output of the planar lightwave circuit, and may use a force detector to perform a force measurement to align the photodiode with respect to a third degree of freedom (e.g., to determine that the photodiode is at a specified proximity to a top surface of the planar lightwave circuit by detecting force from contact between the top surface of the planar lightwave circuit and a surface of the photodiode).

As further shown in FIG. 4, process 400 may include bonding the photodiode to the top surface of the planar lightwave circuit (block 420). For example, a device may die bond the photodiode to the top surface of the planar lightwave circuit. Alternatively, the photodiode may be flip-chip bonded to the top surface of the planar lightwave circuit. For example, the photodiode may be flip-chip mounted and soldered to the planar lightwave circuit. In some implementations, a portion of the photodiode may be bonded to another structure. For example, during flip-chip bonding, a portion of the photodiode may be soldered to a substrate, a transimpedance amplifier and clock and data recovery module, and/or the like.

In some implementations, other components may be attached to form an optical module. For example, before bonding the photodiode to the planar lightwave circuit, a matching block may be bonded to the planar lightwave circuit to reduce a likelihood of damage to a tapered portion of the planar lightwave circuit when bonding the photodiode to the planar lightwave circuit. Additionally, or alternatively, a TIA/CDR may be bonded to the planar lightwave circuit, to the matching block, to an output block (e.g., which may be bonded to the planar lightwave circuit or the matching block), and/or the like. Additionally, or alternatively, one or more wire bonds may be formed to connect a set of components, such as to connect the photodiode and a TIA/CDR, to connect a TIA/CDR and an output block, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical receiver, comprising:
   a planar lightwave circuit with an optical path and a tapered reflection surface to direct an optical beam toward a top surface of the planar lightwave circuit; and
   a photodiode disposed onto the top surface of the planar lightwave circuit such that a receive portion of the photodiode is aligned to the optical path,
      wherein a gap between the photodiode and the planar lightwave circuit is less than 5 microns, and
      wherein a bottom surface of the photodiode extends beyond an edge of the planar lightwave circuit where the top surface of the planar lightwave circuit and the tapered reflection surface meet.

2. The optical receiver of claim 1, further comprising:
   a matching block with a tapered surface matched to the tapered reflection surface to structurally support the tapered reflection surface.

3. The optical receiver of claim 2, wherein the matching block is bonded to the tapered reflection surface of the planar lightwave circuit.

4. The optical receiver of claim 2, wherein a first coefficient of thermal expansion (CTE) of the matching block is within a threshold amount of a second CTE of the planar lightwave circuit.

5. The optical receiver of claim 2, wherein a surface of the matching block and the top surface of the planar lightwave circuit are aligned to within a tolerance of less than 1 micron.

6. The optical receiver of claim 1, wherein the photodiode is passively aligned to the planar lightwave circuit.

7. The optical receiver of claim 1, wherein the gap between the photodiode and the planar lightwave circuit is less than 3 microns.

8. The optical receiver of claim 1, wherein the photodiode is die bonded to the planar lightwave circuit.

9. A method, comprising:
   passively aligning, by a device, a photodiode to an output, of an optical path of a planar lightwave circuit, on a top surface of the planar lightwave circuit such that a receive portion of the photodiode is aligned to the output of the optical path of the planar lightwave circuit,
      wherein the optical path of the planar lightwave circuit extends along the top surface of the planar lightwave circuit and is directed by a tapered reflection surface of the planar lightwave circuit toward the output on the top surface of the planar lightwave circuit; and
   bonding, by the device, the photodiode to the top surface of the planar lightwave circuit based on passively aligning the photodiode to the output of the optical path,
      a bottom surface of the photodiode extending beyond an edge of the planar lightwave circuit where the top surface of the planar lightwave circuit and the tapered reflection surface meet.

10. The method of claim 9, further comprising:
    identifying a set of fiducial markers on the top surface of the planar lightwave circuit,
       wherein the set of fiducial markers correspond to the output of the planar lightwave circuit; and
    wherein passively aligning the photodiode to the planar lightwave circuit comprises:
       passively aligning the photodiode to the set of fiducial markers.

11. The method of claim 10, wherein passively aligning the photodiode to the set of fiducial markers comprises:
    passively aligning the photodiode with respect to a first degree of freedom and a second degree of freedom using the set of fiducial markers; and
    passively aligning the photodiode with respect to a third degree of freedom using a force detector.

12. The method of claim 9, wherein passively aligning the photodiode comprises:
    passively aligning the photodiode with a gap of less than 5 microns.

13. The method of claim 9, wherein bonding the photodiode comprises:
    flip-chip bonding the photodiode to the top surface of the planar lightwave circuit.

14. The method of claim 9, wherein bonding the photodiode comprises:
    soldering the photodiode to at least one of the planar lightwave circuit, a substrate, or a transimpedance amplifier and clock and data recovery module.

15. An optical module, comprising:
    a planar lightwave circuit with an optical path and a tapered reflection surface to direct an optical beam toward a top surface of the planar lightwave circuit;
    a matching block with a tapered surface matched to the tapered reflection surface to structurally support the tapered reflection surface;
    a photodiode disposed onto the top surface of the planar lightwave circuit such that a receive portion of the photodiode is aligned to the optical path,
       wherein a gap between the photodiode and the planar lightwave circuit is less than 1 microns, and
       wherein a bottom surface of the photodiode extends beyond an edge of the planar lightwave circuit where the top surface of the planar lightwave circuit and the tapered reflection surface meet; and
    a transimpedance amplifier and clock and data recovery module connected to the photodiode.

16. The optical module of claim 15, wherein the transimpedance amplifier and clock and data recovery module is bonded to the top surface of the planar lightwave circuit or the matching block.

17. The optical module of claim 15, wherein the tapered reflection surface is metal coated.

18. The optical module of claim 15, wherein the photodiode is flip-chip bonded to the planar lightwave circuit using a solder bond.

19. The optical module of claim 15, wherein the transimpedance amplifier and clock and data recovery module forms the matching block.

20. The optical module of claim 15, wherein the photodiode is passively aligned to the planar lightwave circuit.

* * * * *